(12) United States Patent
Phelps (10) Patent No.: US 10,654,144 B2
(45) Date of Patent: May 19, 2020

(54) SPINDLE RECONDITIONING SYSTEM

(71) Applicant: Dave Phelps, Freeburg, MO (US)

(72) Inventor: Dave Phelps, Freeburg, MO (US)

( * ) Notice: Subject to any disclaimer, the term of this patent is extended or adjusted under 35 U.S.C. 154(b) by 206 days.

(21) Appl. No.: 15/873,396

(22) Filed: Jan. 17, 2018

(65) Prior Publication Data

US 2019/0217439 A1 Jul. 18, 2019

(51) Int. Cl.
*B24B 23/02* (2006.01)
*B23P 6/00* (2006.01)
*B24B 23/08* (2006.01)
*B23K 9/00* (2006.01)

(52) U.S. Cl.
CPC ............... *B24B 23/02* (2013.01); *B23K 9/00* (2013.01); *B23P 6/00* (2013.01); *B24B 23/08* (2013.01)

(58) Field of Classification Search
CPC .......... B24B 23/02; B24B 19/12; B24B 19/08
See application file for complete search history.

(56) References Cited

U.S. PATENT DOCUMENTS

| | | | |
|---|---|---|---|
| 2,675,655 A | 4/1954 | Strait | |
| 3,197,923 A | 8/1965 | Kaczmarek | |
| 3,641,716 A | 2/1972 | Price | |
| 4,098,029 A * | 7/1978 | Shiets | B24B 5/363 29/402.19 |
| 4,644,701 A | 2/1987 | Arrigoni et al. | |
| 5,341,603 A | 8/1994 | Pollock et al. | |
| 5,746,643 A * | 5/1998 | Terasaki | B24B 19/08 451/228 |
| 5,899,797 A * | 5/1999 | Junker | B24B 19/12 451/242 |
| 5,975,995 A * | 11/1999 | Hykes | B24B 19/12 451/10 |
| 6,991,519 B2 * | 1/2006 | Laycock | B24B 5/01 451/10 |
| 7,037,173 B2 * | 5/2006 | Nonoyama | B23Q 15/08 451/49 |
| 7,147,547 B2 * | 12/2006 | Junker | B24B 5/14 451/57 |
| 2006/0111020 A1 * | 5/2006 | Claussen-Markefka | B23Q 1/706 451/11 |

* cited by examiner

*Primary Examiner* — Dung Van Nguyen (57) ABSTRACT

A spindle reconditioning system includes an axle that is mounted on a vehicle. The axle has a spindle and the spindle has a distal end with respect to the axle and a bearing surface. A mount is provided and the mount slidably receives the spindle and engages the distal end of the spindle. Thus, the mount is oriented co-linear with a line extending through the distal end of the spindle and the axle. A grinding unit is movably coupled to the mount and the grinding unit is aligned with the bearing surface on the spindle when the mount is positioned on the spindle. The grinding unit abrades the bearing surface for reconditioning the bearing surface when damage on the bearing surface has been repaired thereby eliminating the need to replace the spindle when the spindle is damaged.

12 Claims, 6 Drawing Sheets

SPINDLE RECONDITIONING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to reconditioning devices and more particularly pertains to a new reconditioning device for field repair of a damaged spindle.

BRIEF SUMMARY OF THE INVENTION

An embodiment of the disclosure meets the needs presented above by generally comprising an axle that is mounted on a vehicle. The axle has a spindle and the spindle has a distal end with respect to the axle and a bearing surface. A mount is provided and the mount slidably receives the spindle and engages the distal end of the spindle. Thus, the mount is oriented co-linear with a line extending through the distal end of the spindle and the axle. A grinding unit is movably coupled to the mount and the grinding unit is aligned with the bearing surface on the spindle when the mount is positioned on the spindle. The grinding unit abrades the bearing surface for reconditioning the bearing surface when damage on the bearing surface has been repaired thereby eliminating the need to replace the spindle when the spindle is damaged.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
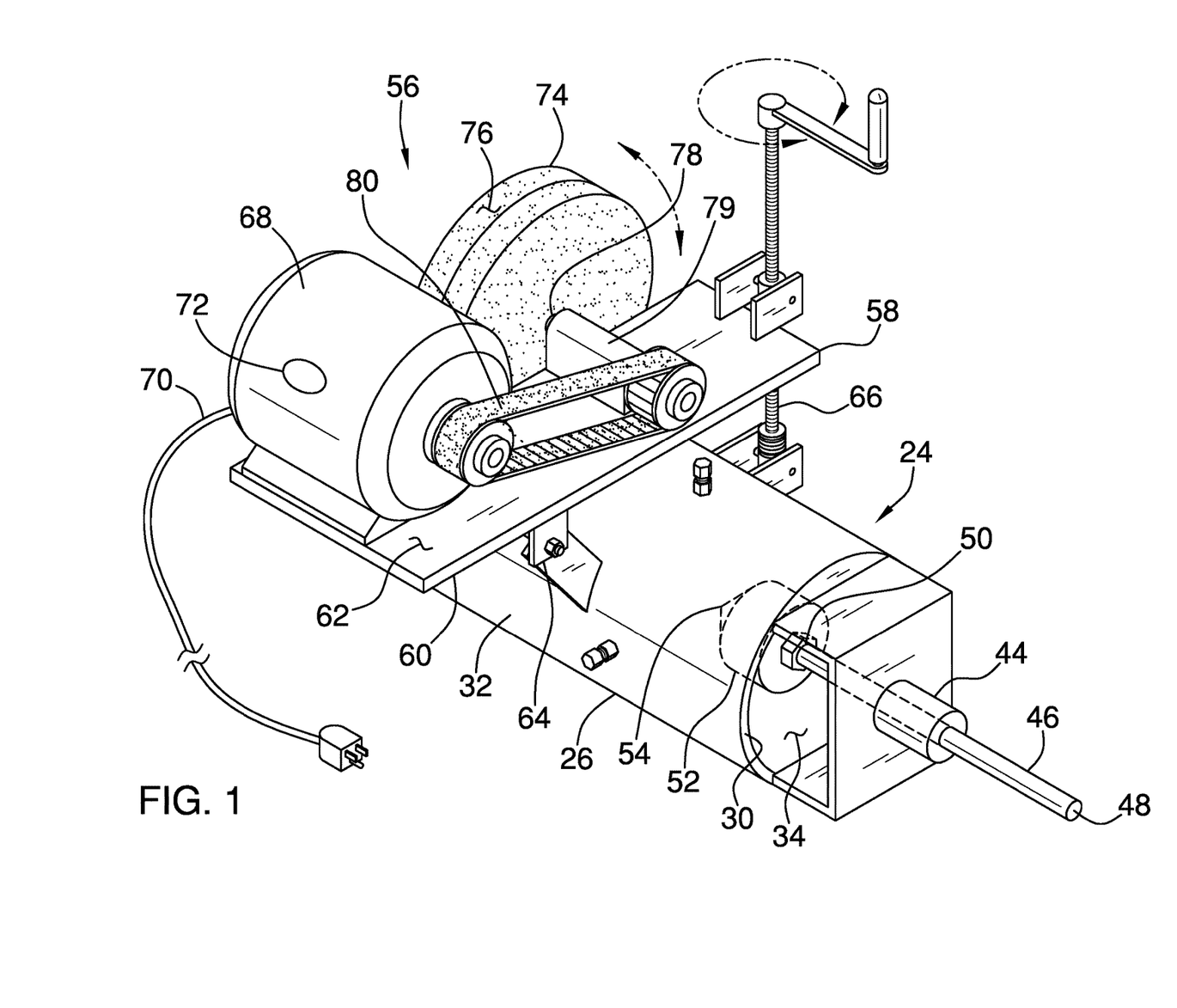
FIG. 1 is a perspective view of a mount and a grinding unit of a spindle reconditioning system according to an embodiment of the disclosure.
Figure 2:
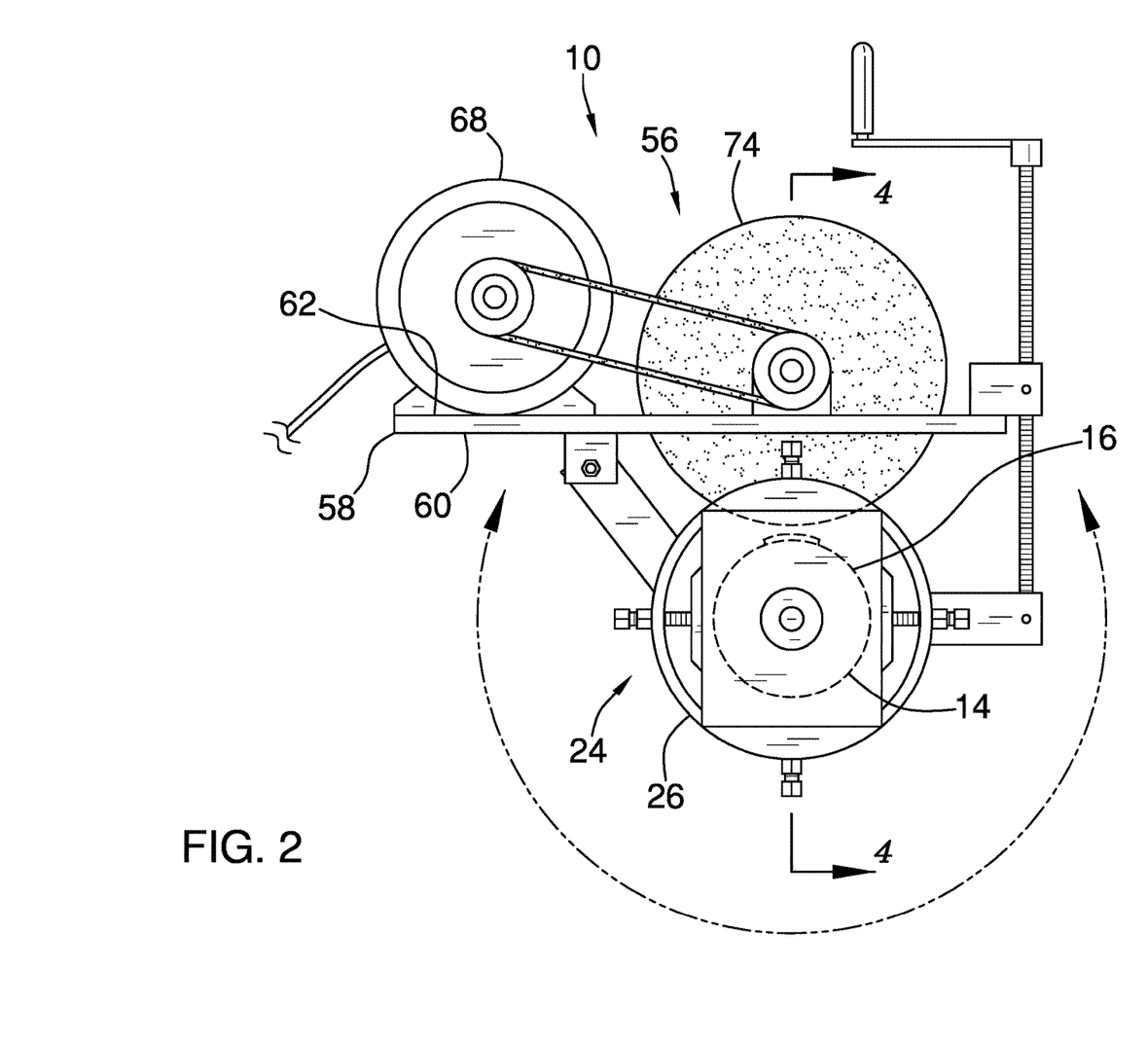
FIG. 2 is a front view of an embodiment of the disclosure.
Figure 3:
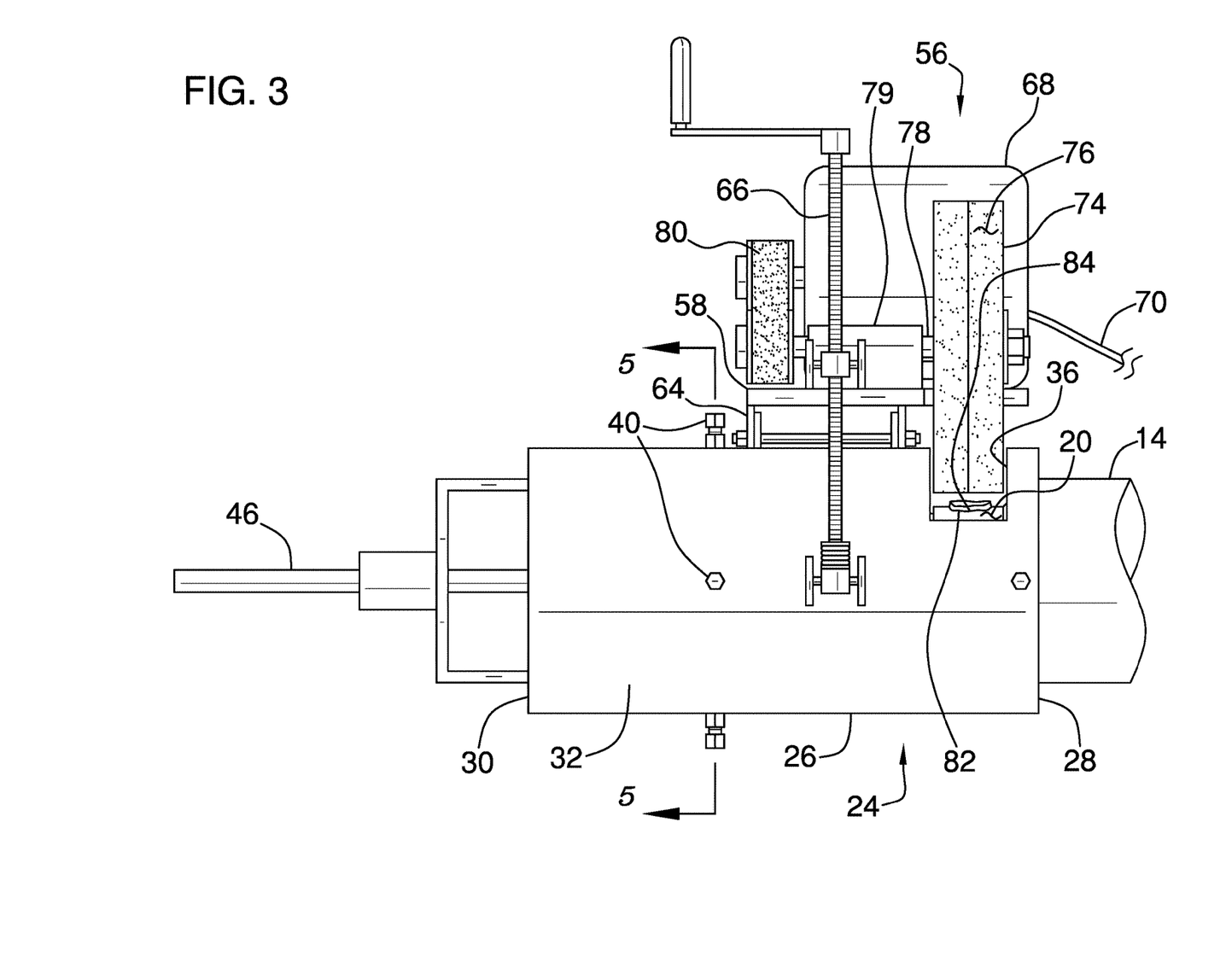
FIG. 3 is a right side view of an embodiment of the disclosure.
Figure 4:
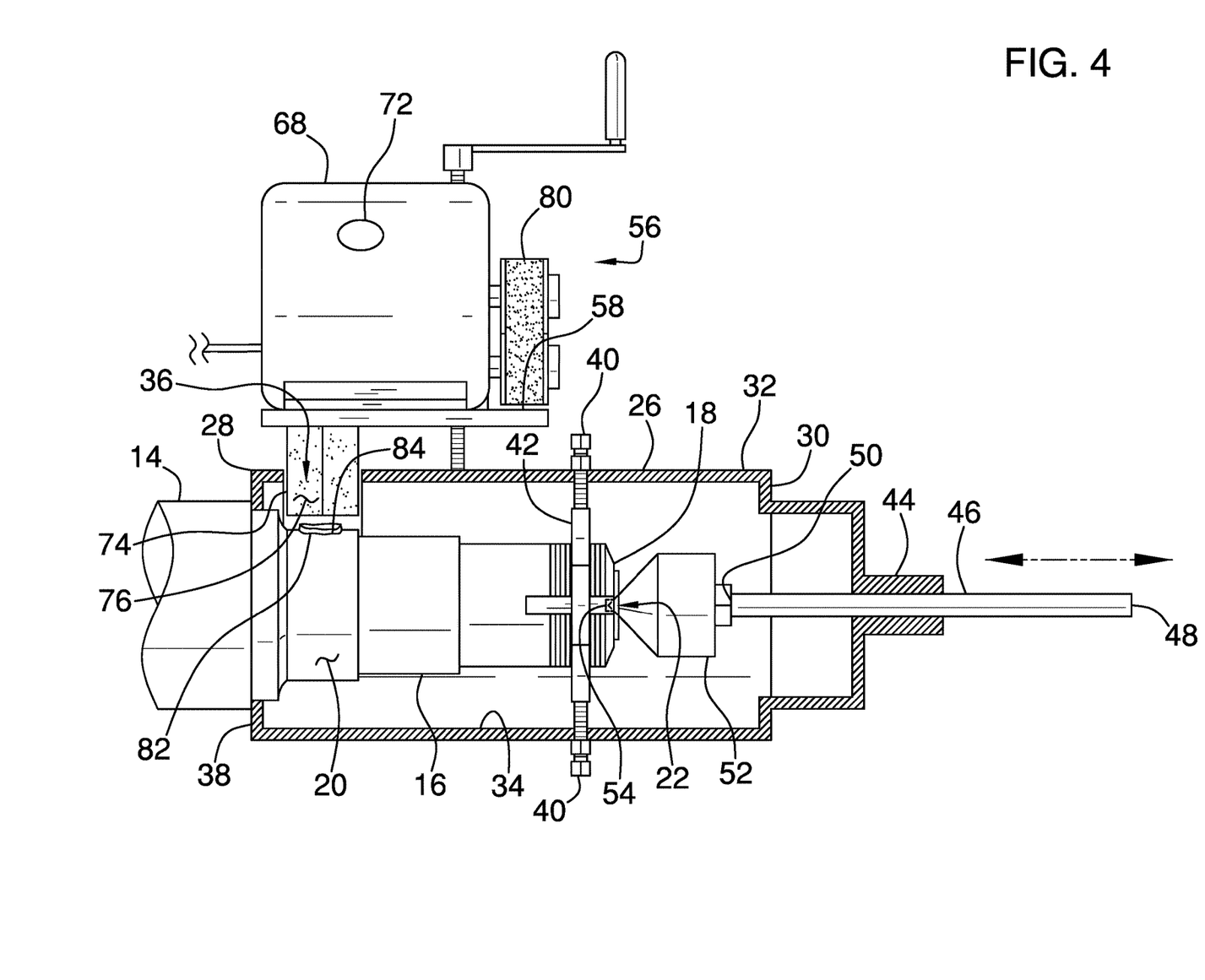
FIG. 4 is a cross sectional view taken along line 4-4 of FIG. 2 of an embodiment of the disclosure.
Figure 5:
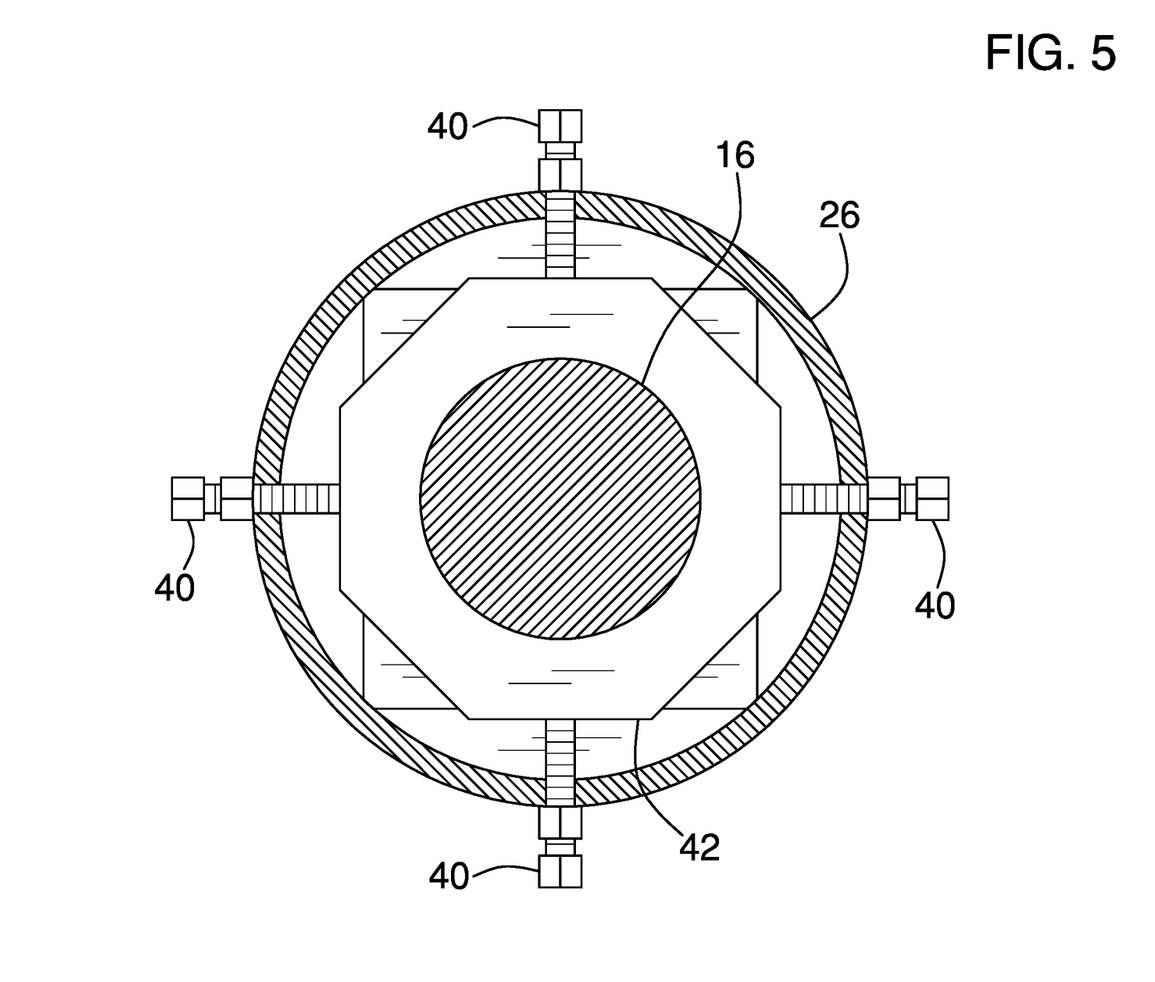
FIG. 5 is a cross sectional view taken along line 5-5 of FIG. 3 of an embodiment of the disclosure.
Figure 6:
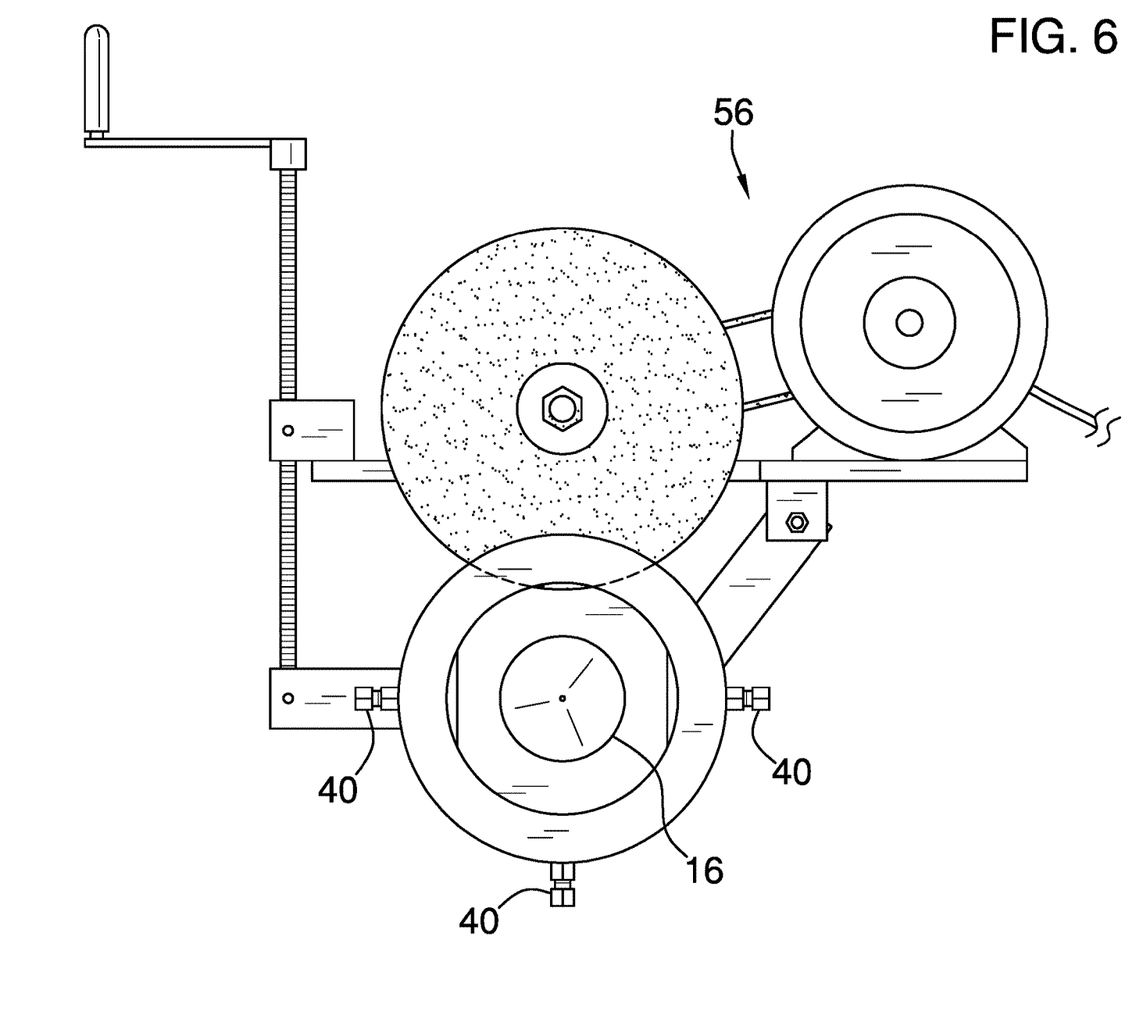
FIG. 6 is a back view of an embodiment of the disclosure.

With reference now to the drawings, and in particular to FIGS. 1 through 6 thereof, a new reconditioning device embodying the principles and concepts of an embodiment of the disclosure and generally designated by the reference numeral 10 will be described.

As best illustrated in FIGS. 1 through 6, the spindle reconditioning system 10 generally comprises an axle 14 that is mounted on a vehicle. The vehicle may be a semi tractor, a semi trailer and any other vehicle that has an axle 14. The axle 14 has a spindle 16 and the spindle 16 has a distal end 18 with respect to the axle 14 and a bearing surface 20. The bearing surface 20 engages a wheel bearing and the distal end 18 has a recess 22 extending towards the axle 14.

A mount 24 is provided and the mount 24 slidably receives the spindle 16 and engages the distal end 18 of the spindle 16. The mount 24 is oriented co-linear with a line extending through the distal end 18 of the spindle 16 and the axle 14 when the mount 24 is positioned on the spindle 16. The mount 24 comprises a tube 26 that has a first end 28, a second end 30 and an outer wall 32 extending therebetween. The outer wall 32 has an inside surface 34 and the first end 28 insertably receives the distal end 18 of the spindle 16. The outer wall 32 has an opening 36 extending therethrough and the opening 36 is positioned closer to the first end 28 than the second end 30. Moreover, the opening 36 is aligned with the bearing surface 20 on the spindle 16 when the tube 26 is positioned around the spindle 16.

A lip 38 is coupled to the inside surface 34 of the outer wall 32 of the tube 26 and the lip 38 is aligned with and is coextensive with the first end 28. The lip 38 engages the spindle 16 when the tube 26 is positioned around the spindle 16 such that the spindle 16 is centered within the tube 26. A plurality of fasteners 40, such as set screw 66s or the like, each extends through the outer wall 32 of the tube 26. The fasteners 40 are spaced apart from each other and are distributed around the outer wall 32. Additionally, each of the fasteners 40 is aligned with a bearing adjustment nut 42 on the spindle 16 when the tube 26 is positioned on the spindle 16. Each of the fasteners 40 is manipulated to frictionally engage the bearing adjustment nut 42 to retain positioning of the tube 26 on the spindle 16.

A bearing 44 is coupled to the second end 30 of the tube 26 and the bearing 44 is centrally positioned on the second end 30. A shaft 46 is provided that has a primary end 48 and a secondary end 50. The shaft 46 extends through the bearing 44 such that the shaft 46 extends from the second end 30 towards the first end 28 of the tube 26. The shaft 46 is centrally positioned in the tube 26 having the secondary end 50 being positioned within the tube 26.

A punch 52 is coupled to the secondary end 50 of the shaft 46 and the punch 52 has a distal end 54 with respect to the secondary end 50. The distal end 54 of the punch 52 tapers to a point. Thus, the distal end 54 of the punch 52 may engage the recess 22 in the distal end 18 of the spindle 16 such that the tube 26 is rotatable about the line extending through the distal end 18 of the spindle 16 and the axle 14. In this way the opening 36 in the tube 26 orbits the bearing surface 20 on the spindle 16 when the tube 26 is rotated about the line.

A grinding unit 56 is provided and the grinding unit 56 is movably coupled to the mount 24. The grinding unit 56 is aligned with the bearing surface 20 on the spindle 16 when the mount 24 is positioned on the spindle 16. Moreover, the grinding unit 56 abrades the bearing surface 20 for reconditioning the bearing surface 20 when the bearing surface 20 has been repaired. In this way the grinding unit 56 facilitates the spindle 16 to be repaired in lieu of replacing the spindle 16 or the axle 14 when the spindle 16 is damaged.

The grinding unit 56 comprises a plate 58 that has a first surface 60 and a second surface 62. The first surface 60 is pivotally coupled to the outer wall 32 of the tube 26 to define a pivot point 64 on the plate 58. Additionally, the plate 58 is positioned closer to the first end 28 of the tube 26 than the second end 30 of the tube 26. A screw 66 is threadably coupled between the plate 58 and the outer wall 32 of the tube 26. The screw 66 is spaced from the pivot point 64 such that the pivot point 64 defines a fulcrum for the screw 66. In this way the screw 66 tilts the plate 58 upwardly and downwardly with respect to the tube 26 when the screw 66 is manipulated. The screw 66 may include a handle that extends laterally away from the screw 66 for manipulating the screw 66.

A motor 68 is coupled to the second surface 62 of the plate 58. The motor 68 may be an electric motor or the like and the motor 68 may include a power cord 70. The power cord 70 may be electrically coupled to a power source, such as a female electrical outlet or the like. A control 72 is electrically coupled to the motor 68 and the control 72 turns the motor 68 on and off.

A grinding wheel 74 is rotatably coupled to the second surface 62 of the plate 58 and the grinding wheel 74 has a grinding surface 76. The grinding wheel 74 may include a drive shaft 78 that is rotatably positioned in a housing 79 on the second surface 62 of the plate 58. The drive shaft 78 may be oriented collinear with the line extending through the distal end 18 of the spindle 16 and the axle 14. The grinding wheel 74 extends through the opening 36 in the tube 26 such that the grinding surface 76 is aligned with the bearing surface 20 on the spindle 16. In this way the grinding surface 76 may abrade the bearing surface 20 when the grinding wheel 74 is rotated. Moreover, the grinding wheel 74 extends a selectable distance through the opening 36 when the screw 66 is manipulated to tilt the plate 58. In this way the grinding wheel 74 may grind the bearing surface 20 on the spindle 16 to a selectable diameter.

A drive 80 is rotatably coupled between the motor 68 and the grinding wheel 74 such that the motor 68 rotates the grinding wheel 74 when the motor 68 is turned on. The drive 80 may include a first pulley being rotatably coupled to the motor 68 and a second pulley being rotatably coupled to the grinding wheel 74. A belt may extend around each of the first and second pulleys to rotate the grinding wheel 74 when the motor 68 is turned on. Additionally, the drive 80 may comprise a plurality of enmeshing gears, a chain drive 80 and any other mechanical drive 80.

In use, the current method of repairing a damaged spindle 16, as a consequence of bearing failure or the like, involves either cutting the damaged spindle 16 from the axle 14 and welding a replacement spindle 16 onto the axle 14, or replacing the entire axle 14. This replacement procedure is not a replacement procedure that can likely be accomplished in the field, such as a breakdown along a highway or a failed inspection at a Dept of Transportation checkpoint. The aforementioned assembly serves to facilitate a field repair of the damaged spindle 16 that does not involve replacement of either the spindle 16 or the axle 14.

The wheel on the damaged spindle 16 is removed in the event of a bearing failure or a failed inspection regarding a lubricant leak from an axle bearing. A welder is employed to build up material 82 for filling a depression 84 that has been frictionally abraded into the bearing surface 20 on the spindle 16. The tube 26 is slid onto the spindle 16 until the distal end 18 of the punch 52 engages the recess 22 in the spindle 16. Each of the fasteners 40 is manipulated to engage the bearing adjustment nut 42 to retain the spindle 16 being centrally positioned within the tube 26. The mount 24 and the grinding unit 56 may additionally be employed in a shop environment in lieu of replacing the spindle 16 or the axle 14.

The motor 68 is turned on and the screw 66 is manipulated until the grinding surface 76 of the grinding wheel 74 begins to abrade the material 82 from the welder. The tube 26 is rotated thereby facilitating the grinding wheel 74 to orbit around the bearing surface 20. Moreover, the screw 66 is manipulated until the material 82 from the welder has been ground down to match the original diameter of the bearing surface 20. In this way the damaged bearing surface 20 is reconditioned in the field thereby facilitating the breakdown to be repaired and to pass the failed inspection.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A spindle reconditioning system for making a field repair on a damaged axle spindle, said system:
- an axle being configured to be mounted on a vehicle, said axle having a spindle, said spindle having a distal end with respect to said axle and a bearing surface, said bearing surface being configured to engage a wheel bearing, said distal end having a recess extending towards said axle;
- a mount slidably receiving said spindle and engaging said distal end of said spindle such that said mount is oriented co-linear with a line extending through said distal end of said spindle and said axle, wherein said mount comprises a tube having a first end, a second end and an outer wall extending therebetween, said outer wall having an inside surface, said first end insertably receiving said distal end of said spindle, said outer wall having an opening extending therethrough, said opening being positioned closer to said first end than said second end, said opening being aligned with said bearing surface on said spindle when said tube is positioned around said spindle;
- a grinding unit being movably coupled to said mount, said grinding unit being aligned with said bearing surface on said spindle when said mount is positioned on said spindle, said grinding unit abrading said bearing surface for reconditioning said bearing surface when said bearing surface has been repaired thereby eliminating the need to replace said spindle when said spindle is damaged; and
- a lip being coupled to said inside surface of said outer wall of said tube, said lip being aligned with an being coextensive with said first end, said lip engaging said spindle when said tube is positioned around said spindle such that said spindle is centered within said tube.

2. A spindle reconditioning system for making a field repair on a damaged axle spindle, said system:
- an axle being configured to be mounted on a vehicle, said axle having a spindle, said spindle having a distal end with respect to said axle and a bearing surface, said bearing surface being configured to engage a wheel bearing, said distal end having a recess extending towards said axle;
- a mount slidably receiving said spindle and engaging said distal end of said spindle such that said mount is oriented co-linear with a line extending through said distal end of said spindle and said axle, wherein said mount comprises a tube having a first end, a second end and an outer wall extending therebetween, said outer wall having an inside surface, said first end insertably receiving said distal end of said spindle, said outer wall having an opening extending therethrough, said opening being positioned closer to said first end than said second end, said opening being aligned with said bearing surface on said spindle when said tube is positioned around said spindle;
- a grinding unit being movably coupled to said mount, said grinding unit being aligned with said bearing surface on said spindle when said mount is positioned on said spindle, said grinding unit abrading said bearing surface for reconditioning said bearing surface when said bearing surface has been repaired thereby eliminating the need to replace said spindle when said spindle is damaged; and
- a plurality of fasteners, each of said fasteners extending through said outer wall of said tube, said fasteners being spaced apart from each other and being distributed around said outer wall, each of said fasteners being aligned with a bearing adjustment nut on said spindle when said tube is positioned on said spindle, each of said fasteners being manipulated to frictionally engage said bearing adjustment nut to retain positioning of said tube on said spindle.

3. A spindle reconditioning system for making a field repair on a damaged axle spindle, said system:
- an axle being configured to be mounted on a vehicle, said axle having a spindle, said spindle having a distal end with respect to said axle and a bearing surface, said bearing surface being configured to engage a wheel bearing, said distal end having a recess extending towards said axle;
- a mount slidably receiving said spindle and engaging said distal end of said spindle such that said mount is oriented co-linear with a line extending through said distal end of said spindle and said axle, wherein said mount comprises a tube having a first end, a second end and an outer wall extending therebetween, said outer wall having an inside surface, said first end insertably receiving said distal end of said spindle, said outer wall having an opening extending therethrough, said opening being positioned closer to said first end than said second end, said opening being aligned with said bearing surface on said spindle when said tube is positioned around said spindle;
- a grinding unit being movably coupled to said mount, said grinding unit being aligned with said bearing surface on said spindle when said mount is positioned on said spindle, said grinding unit abrading said bearing surface for reconditioning said bearing surface when said bearing surface has been repaired thereby eliminating the need to replace said spindle when said spindle is damaged; and
- a bearing being coupled to said second end of said tube.

4. The assembly according to claim 3, further comprising a shaft having a primary end and a secondary end, said shaft extending through said bearing such that said shaft extends from said second end towards said first end of said tube, said shaft being centrally positioned in said tube having said secondary end being positioned within said tube.

5. The assembly according to claim 4, further comprising a punch being coupled to said secondary end of said shaft, said punch having a distal end with respect to said secondary end, said distal end of said punch tapering to a point, said distal end of said punch engaging said recess in said distal end of said spindle such that said tube is rotatable about said line extending through said distal end of said spindle and said axle.

6. A spindle reconditioning system for making a field repair on a damaged axle spindle, said system:
- an axle being configured to be mounted on a vehicle, said axle having a spindle, said spindle having a distal end with respect to said axle and a bearing surface, said bearing surface being configured to engage a wheel bearing, said distal end having a recess extending towards said axle;
- a mount slidably receiving said spindle and engaging said distal end of said spindle such that said mount is oriented co-linear with a line extending through said distal end of said spindle and said axle, wherein said mount comprises a tube having a first end, a second end and an outer wall extending therebetween, said outer wall having an inside surface, said first end insertably receiving said distal end of said spindle, said outer wall having an opening extending therethrough, said opening being positioned closer to said first end than said second end, said opening being aligned with said bearing surface on said spindle when said tube is positioned around said spindle; and
a grinding unit being movably coupled to said mount, said grinding unit being aligned with said bearing surface on said spindle when said mount is positioned on said spindle, said grinding unit abrading said bearing surface for reconditioning said bearing surface when said bearing surface has been repaired thereby eliminating the need to replace said spindle when said spindle is damaged, said grinding unit comprises a plate having a first surface and a second surface, said first surface being pivotally coupled to said outer wall of said tube to define a pivot point on said plate, said plate being positioned closer to said first end of said tube than said second end of said tube.

7. The assembly according to claim 6, further comprising a screw being threadably coupled between said plate and said outer wall of said tube, said screw being spaced from said pivot point such that said pivot point defines a fulcrum for said screw, said screw tilting said plate upwardly and downwardly with respect to said tube when said screw is manipulated.

8. The assembly according to claim 7, further comprising a motor being coupled to said second surface of said plate.

9. The assembly according to claim 8, further comprising a grinding wheel being rotatably coupled to said second surface of said plate, said grinding wheel having a grinding surface, said grinding wheel extending through said opening in said tube such that said grinding surface is aligned with said bearing surface on said spindle thereby facilitating said grinding surface to abrade said bearing surface when said grinding wheel is rotated.

10. The assembly according to claim 9, wherein said grinding wheel extends a selectable distance through said opening when said screw is manipulated to tilt said plate thereby facilitating said grinding wheel to grind said bearing surface to a selectable diameter.

11. The assembly according to claim 10, further comprising a drive being rotatably coupled between said motor and said grinding wheel such that said motor rotates said grinding wheel when said motor is turned on.

12. A spindle reconditioning system for making a field repair on a damaged axle spindle, said system:
an axle being configured to be mounted on a vehicle, said axle having a spindle, said spindle having a distal end with respect to said axle and a bearing surface, said bearing surface being configured to engage a wheel bearing, said distal end having a recess extending towards said axle;
a mount slidably receiving said spindle and engaging said distal end of said spindle such that said mount is oriented co-linear with a line extending through said distal end of said spindle and said axle, said mount comprising:
a tube having a first end, a second end and an outer wall extending therebetween, said outer wall having an inside surface, said first end insertably receiving said distal end of said spindle, said outer wall having an opening extending therethrough, said opening being positioned closer to said first end than said second end, said opening being aligned with said bearing surface on said spindle when said tube is positioned around said spindle;
a lip being coupled to said inside surface of said outer wall of said tube, said lip being aligned with an being coextensive with said first end, said lip engaging said spindle when said tube is positioned around said spindle such that said spindle is centered within said tube;
a plurality of fasteners, each of said fasteners extending through said outer wall of said tube, said fasteners being spaced apart from each other and being distributed around said outer wall, each of said fasteners being aligned with a bearing adjustment nut on said spindle when said tube is positioned on said spindle, each of said fasteners being manipulated to frictionally engage said bearing adjustment nut to retain positioning of said tube on said spindle;
a bearing being coupled to said second end of said tube;
a shaft having a primary end and a secondary end, said shaft extending through said bearing such that said shaft extends from said second end towards said first end of said tube, said shaft being centrally positioned in said tube having said secondary end being positioned within said tube;
a punch being coupled to said secondary end of said shaft, said punch having a distal end with respect to said secondary end, said distal end of said punch tapering to a point, said distal end of said punch engaging said recess in said distal end of said spindle such that said tube is rotatable about said line extending through said distal end of said spindle and said axle; and
a grinding unit being movably coupled to said mount, said grinding unit being aligned with said bearing surface on said spindle when said mount is positioned on said spindle, said grinding unit abrading said bearing surface for reconditioning said bearing surface when said bearing surface has been repaired thereby eliminating the need to replace said spindle when said spindle is damaged, said grinding unit comprising:
a plate having a first surface and a second surface, said first surface being pivotally coupled to said outer wall of said tube to define a pivot point on said plate, said plate being positioned closer to said first end of said tube than said second end of said tube;
a screw being threadably coupled between said plate and said outer wall of said tube, said screw being spaced from said pivot point such that said pivot point defines a fulcrum for said screw, said screw tilting said plate upwardly and downwardly with respect to said tube when said screw is manipulated;
a motor being coupled to said second surface of said plate;
a grinding wheel being rotatably coupled to said second surface of said plate, said grinding wheel having a grinding surface, said grinding wheel extending through said opening in said tube such that said grinding surface is aligned with said bearing surface on said spindle thereby facilitating said grinding surface to abrade said bearing surface when said grinding wheel is rotated, said grinding wheel extending a selectable distance through said opening when said screw is manipulated to tilt said plate thereby facilitating said grinding wheel to grind said bearing surface to a selectable diameter;
a drive being rotatably coupled between said motor and said grinding wheel such that said motor rotates said grinding wheel when said motor is turned on; and a control being coupled to said motor, said control turning said motor on and off.

\* \* \* \* \*